United States Patent
Brouwers (10) Patent No.: US 12,490,876 B2
(45) Date of Patent: Dec. 9, 2025

(54) ROBOT WITH OBSTACLE-DETECTING DEFORMATION SENSORS

(71) Applicant: BISSELL Inc., Grand Rapids, MI (US)

(72) Inventor: Andrew J. Brouwers, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 232 days.

(21) Appl. No.: 18/331,485

(22) Filed: Jun. 8, 2023

(65) Prior Publication Data

US 2024/0000279 A1 Jan. 4, 2024

Related U.S. Application Data

(60) Provisional application No. 63/356,602, filed on Jun. 29, 2022.

(51) Int. Cl.
*A47L 11/40* (2006.01)

(52) U.S. Cl.
CPC ....... *A47L 11/4008* (2013.01); *A47L 11/4011* (2013.01); *A47L 2201/04* (2013.01)

(58) Field of Classification Search
CPC .............. A47L 11/4008; A47L 11/4011; A47L 2201/04; A47L 9/2805; A47L 11/4061; A47L 9/2852

USPC ........................................................ 701/23
See application file for complete search history.

(56) References Cited

U.S. PATENT DOCUMENTS

| | | | |
|---|---|---|---|
| 10,766,446 B2 * | 9/2020 | Badger, II | B60R 21/0136 |
| 2018/0095472 A1 * | 4/2018 | Windorfer | G05D 1/0234 |
| 2022/0219320 A1 * | 7/2022 | Søe-Knudsen | B25J 13/08 |
| 2022/0395154 A1 * | 12/2022 | Arora | A46B 15/0053 |

FOREIGN PATENT DOCUMENTS

| | | | | |
|---|---|---|---|---|
| DE | 202019106926 U1 * | 2/2020 | | B25J 5/007 |
| JP | 2011030888 A * | 2/2011 | | |

\* cited by examiner

*Primary Examiner* — Jelani A Smith
*Assistant Examiner* — George A Alcorn, III
(74) *Attorney, Agent, or Firm* — Quinn IP Law (57) ABSTRACT

A robot such as a floor cleaning robot includes a body, a motorized drive system connected to the body and operable for moving the robot relative to a floor surface, at least one deformation sensor, and a controller. Each deformation sensor may be a strain sensor, such as a strain gauge, and is connected to the body and configured to measure a deformation thereof, and to output an electronic signal indicative of the deformation. The controller detects a threshold deformation of the body indicative of contact with an obstacle by processing the electronic signal, and thereafter modifies a dynamic state of the robot via regulation of the motorized drive system in response to the threshold deformation.

18 Claims, 5 Drawing Sheets

ROBOT WITH OBSTACLE-DETECTING DEFORMATION SENSORS

CROSS-REFERENCE TO RELATED APPLICATIONS

This application claims priority to and the benefit of U.S. Provisional Application Ser. No. 63/356,602 filed on Jun. 29, 2022, which is hereby incorporated by reference in its entirety.

TECHNICAL FIELD

The subject disclosure pertains to systems and methods for detecting obstacles in the path of a robot. In particular, the subject disclosure pertains to obstacle detection aboard a floor cleaning robot during the performance of a floor cleaning task.

BACKGROUND

As appreciated in the art, robots are often configured for cleaning a floor surface without the assistance of an operator. That is, unlike handheld or upright vacuum cleaners or extraction cleaners, floor cleaning robots are capable of autonomously performing a cleaning task by autonomously mapping and navigating a defined floor surface and executing a cleaning program using an onboard control unit ("controller"). In addition to the controller, a typical floor cleaning robot is equipped with a rechargeable power source and a motorized drive system. The power source, typically a lithium-ion battery pack, is rechargeable using a docking station. In operation, the battery pack is discharged under supervision of the controller to energize the motorized drive system, which in turn is connected to a set of drive wheels suitable for gripping and traversing the floor surface.

In addition to the motorized drive system, a floor cleaning robot also includes an onboard suction source that provides suction forces suitable for lifting and removing dust, hair, dirt, pet dander, and other debris from the floor surface. In some configurations, a motorized brush roll is rotated at a high rate of speed in conjunction with the applied suction forces from the suction source to direct the collected debris into an onboard collection bin. Other types of floor cleaning robots are equipped with fluid distribution systems that collectively allow the robot to apply water or a suitable cleaning solution to the floor surface, e.g., carpeted floors and rugs. Extracted fluid and debris is ultimately deposited into a tank for disposal.

BRIEF SUMMARY

Floor cleaning robots of the types described herein are operable for travelling across a floor surface while performing a programmed floor cleaning task. Successful navigation of the floor surface during the performance of the floor cleaning task relies on accurate and timely detection of furniture, walls, stairs, household objects, and other obstacles in the robot's travel path. Detection of an obstacle ultimately causes an onboard controller to cause the robot to stop, turn, back up, or otherwise adjust its travel trajectory before proceeding with its programmed cleaning task.

To that end, the floor cleaning robots of the present disclosure are equipped with a deformation-based obstacle detection circuit, the inclusion of which allows the robot to optionally forego the use of traditional perimeter bumpers. As appreciated in the art, traditional floor cleaning robot constructions typically position one or more switches between the body of the robot and a flexible outer bumper. When the robot contacts an obstacle with the bumper, the bumper translates inward toward the body and thereby activates the switches, i.e., opens or closes the switches depending on the particular switch configuration. Activation of the switches in this manner causes an onboard controller to register an obstacle detection event in its memory, e.g., as a bit code indicative of obstacle detection, and to thereafter respond with an appropriate control action. While perimeter bumpers are effective and widely used in the art, the interposition of switches between the bumper and the body requires a relatively large standoff distance between the bumper and the body's leading surface. Attendant benefits of the disclosed obstacle detection circuit therefore include additional cleaning space along a leading surface of the robot, with a corresponding improvement in edge cleaning effectiveness, along with an accompanying reduction in weight and packaging space.

In particular, an autonomous robot such as the floor cleaning robot exemplified herein is configured to detect obstacles in its path. Obstacle detection occurs based on a measured deflection or deformation of a body and/or forward assembly of the robot. In keeping with the representative floor cleaning embodiment of the robot for illustrative consistency, the forward assembly can be a nozzle assembly, for instance a suction nozzle and an associated agitator. In floor surface cleaning applications, it is desirable to place a brush roll or other agitator as close as possible to the leading surface, which as noted above is not possible using perimeter bumpers and associated bumper-activated sensors. The alternative solutions described herein enable the agitator to be placed in close proximity to the leading surface for optimal edge cleaning effectiveness, such as within one wall thickness of the body, or less than about 5 millimeters in a possible construction, thereby improving edge cleaning efficiency while eliminating packaging space, weight, and associated costs of the bumper and associated push-button switches as noted above.

An aspect of the disclosure includes an autonomous robot having a body, a motorized drive system connected to the body, at least one deformation sensor, and a controller. Although exemplified herein as a floor cleaning robot, the present teachings could be applied to other types of floor-propelled robots that may encounter an obstacle in the course of navigating a route, e.g., robots configured to perform security, inspection, surveillance, delivery, or other programmed operations. Solely for illustrative consistency, the robot described in detail below will be described in the context of a floor cleaning robot, inclusive of wet/fluid-based and dry/brush roll-based robots, without limiting beneficial applications to such a configuration.

The motorized drive system used herein is operable for moving the floor cleaning robot relative to a particular surface to be cleaned ("floor surface"). The deformation sensor, e.g., a strain gauge or a plurality thereof, is connected to the body and configured to measure deflection or deformation value of the body when the body contacts an obstacle. For example, when the robot is traveling along the floor surface and contacts a table leg, the body will tend to deflect or deform away from the table leg to a detectable degree. This deformation is measured by the disclosed deformation sensor(s). Each deformation sensor responds by transmitting an electronic signal to the controller that is indicative of the measured deformation.

The controller in this representative embodiment is also programmed to detect a threshold deformation of the body.

This may occur by processing the electronic signal, for instance by comparing the measured deformation to a recorded minimum actionable deformation level below which the robot does not adjust its course. For instance, very lightweight or deflectable obstacles may simply be pushed aside without requiring course correction. For threshold deformations, however, the controller modifies a dynamic state of the robot via the motorized drive system, such as by stopping, reversing, and/or turning the robot to avoid the detected obstacle.

In some embodiments as noted above, the robot includes a nozzle assembly. The nozzle assembly may be an integral part of the body or connected to the body in different constructions. For instance, the nozzle assembly and the body may be interconnected via one or more hinge assemblies.

The nozzle assembly can include a leading surface and a motorized brush roll. The motorized brush roll in a possible construction is positioned less than about 5 millimeters (mm) from the leading surface, which is distinguishable from a typical 10-20 mm standoff distance used in constructions employing the aforementioned perimeter bumper assembly. The present solutions can be characterized by the absence of the perimeter bumper assembly and the myriad of benefits associated with this absence, at least some of which are summarized above. However, those skilled in the art will appreciate that the deformation sensor(s) could also be used in conjunction with the perimeter bumper assembly in other configurations, e.g., on perimeter surfaces not otherwise equipped with the bumper assembly, or to provide sensor redundancy.

In one or more representative embodiments, the leading surface of the body/nozzle assembly is a linear surface and an opposing trailing surface is a curvilinear surface. The perimeter shape of the body when viewed from above in such an embodiment may therefore be colloquially described as "D-shaped". As appreciated by those skilled in the art, the presentation of the linear surface toward an edge of a surface to be cleaned allows the robot to closely approach the edge for optimal edge cleaning efficiency. Relative to a circular perimeter, therefore, such a D-shaped perimeter has specific performance advantages. However, robots having circular perimeters may likewise benefit from the present teachings, and thus the solutions described in detail below are not limited to robots having D-shaped or combined linear and curvilinear bodies.

The deformation sensors used herein may be optionally embodied as one or more strain gauges. For example, each respective one of a plurality of strain gauges could be mounted to the body of the floor cleaning robot via a corresponding flexible bracket. Each flexible bracket may be constructed of sheet metal or spring steel having a thickness of less than about 2 mm, such that the flexible bracket is able to flex or bend in a resilient manner to transfer forces to the strain gauge. In embodiments using such exemplary strain gauges, a first strain gauge may be positioned adjacent to or along a centerline of the body with second and third strain gauges flanking the first strain gauge, such that at least three strain gauges are spaced apart from one another on the body. However, those skilled in the art will recognize that other possible embodiments may be contemplated within the scope of the disclosure, including using only one strain gauge, or using two strain gauges, e.g., one strain gauge handling a front impact and another handling a side impact, or three strain gauges, e.g., one strain gauge handling a front impact and the remaining two each handling a respective side impact.

One or more hinge assemblies may interconnect the body and the above-summarized nozzle assembly along a hinge line in one or more embodiments of the present teachings, with the strain gauge(s) positioned along or adjacent to the hinge line.

A method for controlling a floor cleaning robot is also disclosed herein. The robot in a possible construction includes a motorized drive system operable for moving the robot relative to a floor surface. The method in a possible implementation may include measuring a strain value of the body via at least one strain gauge and detecting, via a controller, a threshold deformation of the body by processing the electronic signal when the body contacts an obstacle. The method may also include modifying a dynamic state of the floor cleaning robot via the motorized drive system in response to the threshold deformation.

Also disclosed herein is a floor cleaning robot having a body, a nozzle assembly, a motorized drive system, a plurality of strain sensors, and a controller. The body includes a leading surface relative to a forward direction of travel of the floor cleaning robot. The nozzle assembly, which in some embodiments may include a brush roll, is connected to or formed integrally with the body and positioned less than about 5 mm from the leading surface of the body. The motorized drive system, which is connected to the body, is operable for moving the robot relative to a floor surface. In this particular configuration, the plurality of strain sensors are connected to the body and/or the nozzle assembly via a corresponding flexible bracket. Each strain sensor is configured to measure a deformation of the body as a strain value, and to output an electronic signal indicative of the strain value.

The controller in this representative configuration is in communication with the strain sensors and configured to detect a threshold deformation of the body indicative of contact with an obstacle by processing the electronic signal. The controller thereafter modifies a dynamic state of the robot via regulation of the motorized drive system. This action occurs in response to the threshold deformation. The floor cleaning robot in this particular configuration is characterized by an absence of an obstacle-detecting perimeter bumper assembly.

The above summary is not intended to represent every possible construction or aspect of the subject disclosure. Rather, the foregoing summary is intended to exemplify some of the novel aspects and features disclosed herein. The above-summarized features and other features and advantages of the subject disclosure will be readily apparent from the following detailed description of representative embodiments and modes for carrying out the subject disclosure when taken in connection with the accompanying drawings and the appended claims.

BRIEF DESCRIPTION OF THE DRAWINGS

The drawings described herein are for illustrative purposes only, are schematic in nature, and are intended to be exemplary rather than to limit the scope of the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The subject disclosure may be embodied in many different forms. Representative examples are shown in the various drawings and described in detail below, with the understanding that the descriptions are exemplifications of the disclosed principles and not limitations of the broad aspects of the disclosure. To that end, elements and limitations described below, but not explicitly set forth in the claims, should not be incorporated into the claims, singly or collectively, by implication, inference, or otherwise. Moreover, the drawings discussed herein may not be to scale, and are provided purely for instructional purposes. Thus, the specific and relative dimensions shown in the Figures are not to be construed as limiting.

Additionally, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Further, the words "example" or "exemplary" are used herein to mean serving as an example, instance, or illustration. Any aspect or design described herein as "exemplary" is not necessarily to be construed as preferred or advantageous over other aspects or designs. Rather, use of the term "exemplary" is intended to present concepts in a concrete fashion. Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Figure 1:
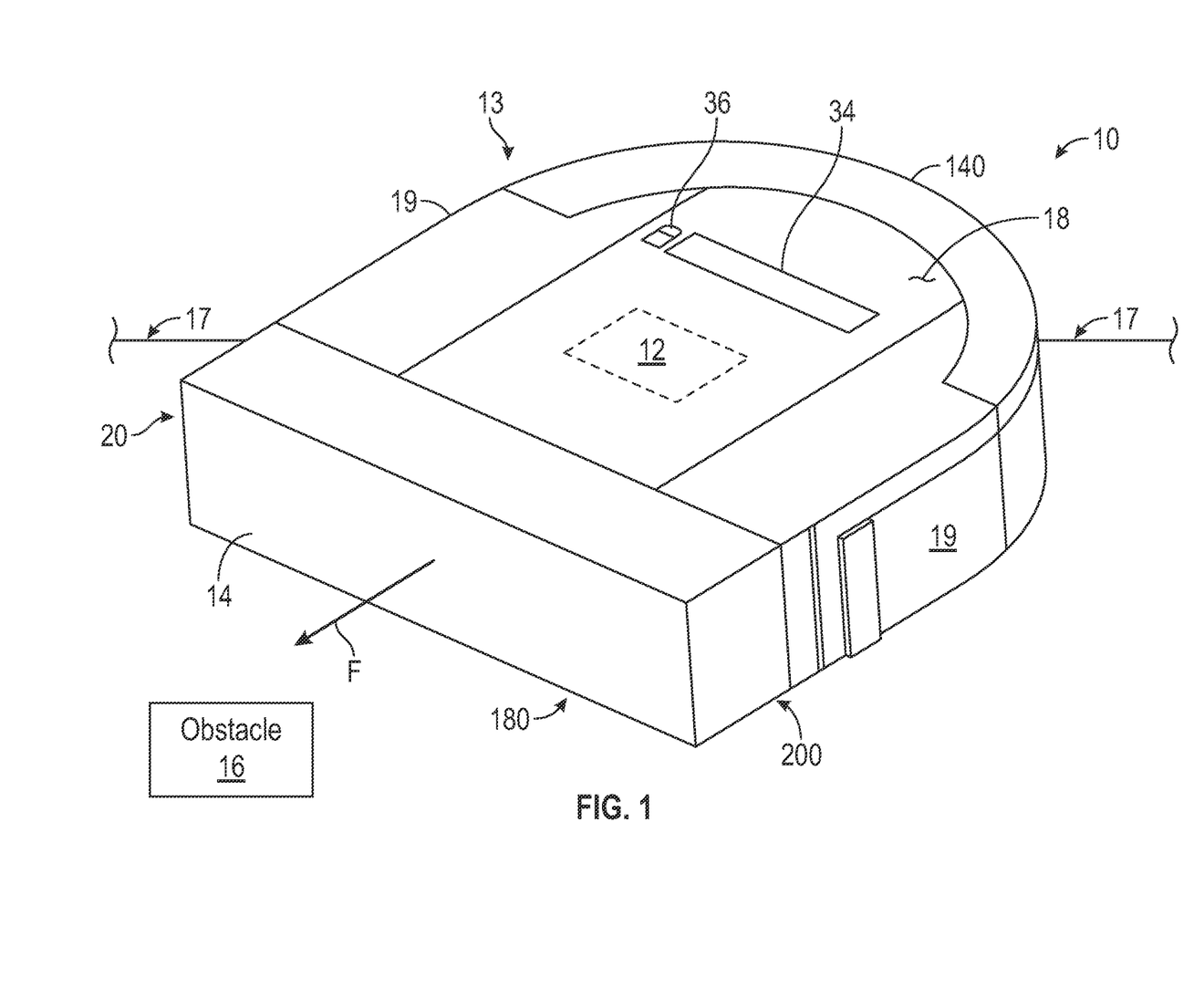
FIG. 1 is a perspective view illustration of an embodiment of a floor cleaning robot in accordance with an aspect of the disclosure.

Referring to the drawings, wherein like reference numbers refer to the same or like components in the several Figures, a robot 10 is shown in FIG. 1 that is equipped with an obstacle detection circuit 12 as set forth in detail hereinbelow with reference to FIGS. 2-7. In the illustrated exemplary configuration of FIG. 1, the robot 10 embodies an autonomously controlled floor cleaning robot. As appreciated in the art, floor cleaning robots are typically configured to sweep, dust, or mop a floor surface, with collected debris ultimately deposited into a removable bin for disposal. The present teachings may be applied to such robots, as well as other types of floor-propelled robots, e.g., security, inspection, surveillance, or delivery robots as noted above. For illustrative consistency, however, the robot 10 of FIG. 1 will be referred to hereinafter in the context of a floor cleaning robot 10 without limiting the scope of the present teachings, and thus referred to below as a floor cleaning robot 10 for illustrative consistency.

The floor cleaning robot 10 of FIG. 1 includes a body 13 adapted to selectively mount components of the required systems to form a unitary movable device. In a possible construction, the body 13 may be constructed as a molded shell of a lightweight but structurally robust material such as plastic or aluminum. An electronic control unit or "controller" (see FIG. 2) is operably coupled with the various functional systems of the robot 10 for the purpose of controlling operation thereof. In an embodiment, a leading surface 14 of the body 13 relative to a forward direction of travel (arrow F) can be a flat or planar surface, and an opposing trailing surface 140 of the body 13 can be a curvilinear or hemispherical surface, such that the robot 10 has a generally D-shaped outer perimeter when viewed from above. As appreciated by those skilled in the art, the presentation of a linear surface as the leading surface 14 allows the robot 10 to closely approach a wall or other flat/linear edge for optimal edge cleaning efficiency. Relative to a body 13 having a circular perimeter, a D-shaped perimeter of the body 13 has specific performance advantages. However, the outer perimeter of the robot 10 may be circular in other embodiments within the scope of the disclosure, and therefore the present teachings are not limited to D-shaped configurations of the robot 10 or body 13.

Figure 2:
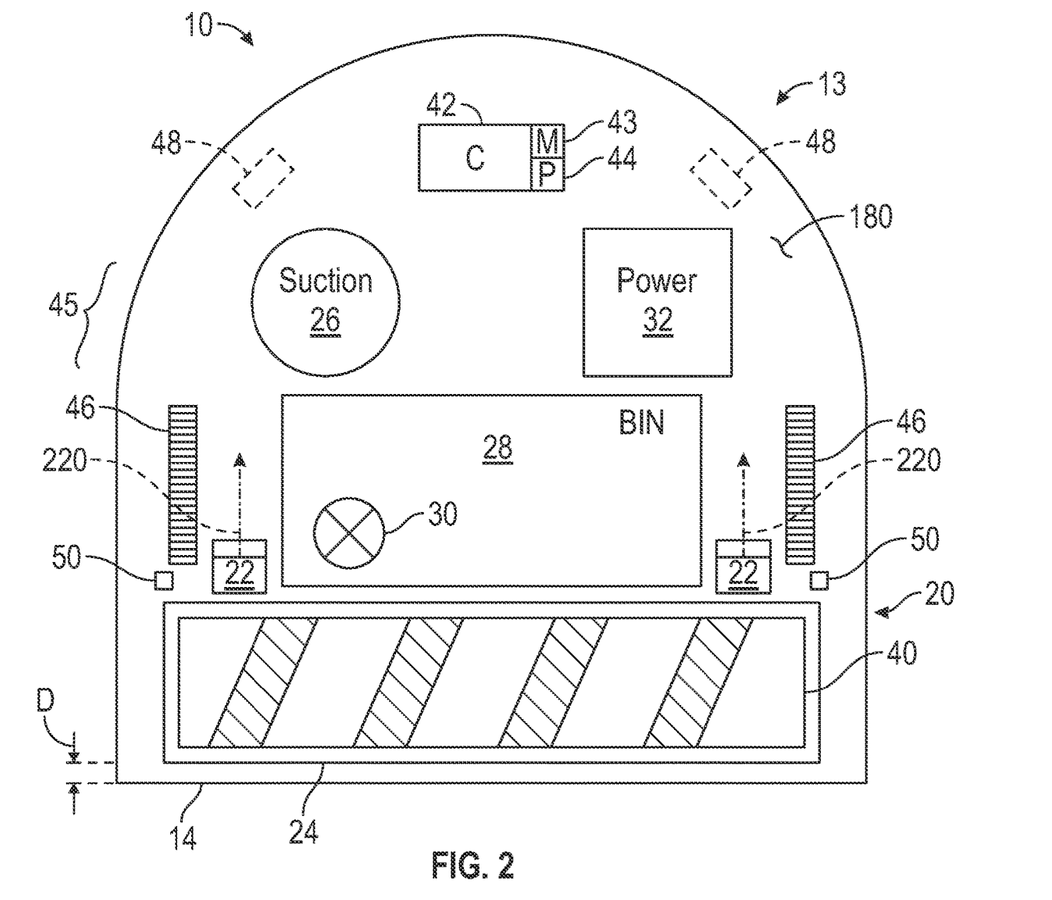
FIG. 2 is a bottom view illustration of the floor cleaning robot of FIG. 1 according to a possible construction.

The body 13 depicted in FIG. 1 also includes an upper surface IS and a lower surface 180, the latter of which is shown in more detail in FIG. 2. Being D-shaped in this construction, the trailing surface 140 tapers into side walls 19, which in turn are arranged approximately normal to the leading surface 14. In some embodiments such as the exemplary embodiment of FIG. 1, the body 13 is connected to a forward assembly 20, hereinafter referred to as a nozzle assembly 20 to reflect the corresponding representative use of the nozzle assembly 20 aboard the floor cleaning robot 10. In embodiments in which the nozzle assembly 20 is connected to the body 13, a hinge joint 200 may exist between the nozzle assembly 20 and the body 13, with such an embodiment also illustrated in FIGS. 6A and 6B. A user interface 34 may be mounted to the body 13 to allow operation and control of the robot 10 by a user while the robot 10 potentially displays information to aid in the user's decision making process. A power switch 36 located proximate the user interface 34 or elsewhere on the body 13 can be selectively closed by the user to activate the robot 10.

As summarized above, successful navigation of the floor cleaning robot 10 requires the floor cleaning robot 10 to detect an obstacle 16 quickly and accurately when the obstacle 16 is situated in a path of travel of the robot 10. Robots such as the robot 10 of FIG. 1 may at times be required to navigate obstacle-rich environments. Floor cleaning robots used to clean a floor surface 17 of a typical residence, for instance, frequently encounter furniture legs, shoes, toys, household items, walls, and doors as the robot 10 traverses a travel route in the process of cleaning the floor surface 17. Successful detection of the obstacle 16 in turn allows the robot 10 to adjust its course and continue on with its cleaning task, such as by stopping, reversing, or turning to change its trajectory relative to the floor surface 17. To that end, the robot 10 also includes the obstacle detection circuit 12 described in detail below, which may be characterized by an absence of a perimeter bumper and switch as noted above.

Referring to FIG. 2, the lower surface 180 of the floor cleaning robot 10 is shown to illustrate various onboard systems used in the locomotion and operational control of the robot 10. While not illustrated, the robot 10 can be provided with additional functional systems, such as a navigation system for guiding the movement of the robot 10 over the floor surface 17 (see FIG. 1), a mapping system for generating and storing maps of the floor surface 17 and recording status or other environmental variable information, and/or a dispensing system for applying a treating agent to the floor surface 17. The treating agent can be stored aboard the robot 10 in such embodiments.

The floor cleaning robot 10 of FIG. 2 can also include a working air path through the body 13 having an air inlet and an air outlet, a suction nozzle 24, a suction source 26 in fluid communication with the suction nozzle 24 for generating a working air stream through the working air path, and a debris bin 28 for collecting dirt, dust, hair, pet dander, and other debris from the working airstream for later disposal. The suction nozzle 24 in the illustrated configuration defines the air inlet of the working air path. The suction source 26 for its part can include a motor/fan assembly carried by the body 13 upstream of the air outlet, and can define a portion of the working air path. The bin 28 for its part may define a portion of the working air path and comprise a bin inlet in fluid communication with the air inlet. A separator 30 can be formed in a portion of debris bin 28 for separating fluid and entrained debris from the working airstream. Non-limiting examples of the separator include a cyclone separator, a filter screen, a foam filter, a HEPA filter, a filter bag, or combinations thereof.

In the illustrated embodiment of FIG. 2, the suction source 26 can be electrically connected to a power source 32 such as a rechargeable lithium-ion battery or another application-suitable battery pack. As appreciated in the art but omitted from FIG. 2 for illustrative simplicity, charging contacts for such a battery pack may be provided on the exterior of the body 13. A docking station (not shown) for receiving the floor cleaning robot 10 for charging can be equipped with corresponding charge contacts.

For locomotion, the floor cleaning robot 10 can be equipped with a drive system 45, including drive wheels 46 for gripping the floor surface 17 of FIG. 1 and propelling the robot 10. In the illustrated embodiment of FIG. 2, the drive wheels 46 are located aft of the suction nozzle 24 and an agitator 40. Non-powered or freewheeling wheels (not shown) may be included for proper balance of the robot 10 as needed. The drive system 45, one or more electric traction motors of which are not shown for illustrative simplicity, can receive inputs from an electronic control unit or controller (C) 42 for powering the drive wheels 46, with the controller 42 informed in real time by the various sensors of the obstacle detection circuit 12 as set forth below. In different drive modes, the drive wheels 46 may be driven in a forward or reverse direction, or the individual drive wheels 46 may be driven individually to turn the robot 10, i.e., to implement differential steering as appreciated in the art.

Still referring to FIG. 2, the floor cleaning robot 10 can include the nozzle assembly 20 having the agitator 40, e.g., a motorized brush roll as shown, which is located adjacent the suction nozzle 24. In one example, the suction nozzle 24 and the agitator 40 are provided along the leading surface 14 of the robot 10. The agitator 40 in such a construction can be mounted for rotation about a substantially horizontal axis relative to the floor surface 17 of FIG. 1 over which the robot 10 moves during a cleaning operation.

The controller 42 is operably connected to the various functional systems described herein to control operation of the floor cleaning robot 10. The controller 42 is in communication with the user interface 34 of FIG. 1 for receiving inputs from a user. The controller 42 is also connected to or in wireless communication with various onboard sensors for receiving input about the environment and can use the sensor input to control operation of the robot 10. To that end, the controller 42 is equipped with memory (M) 43 and one or more processors (P) 44 as shown schematically in FIG. 2.

Within the scope of the disclosure, the processor(s) 44 may be embodied as one or more of a microcontroller, processor, Application Specific Integrated Circuit (ASIC), Field-Programmable Gate Array (FPGA), central processing unit (CPU), etc. The controller 42 also includes application-specific memory, including associated non-transitory memory and storage devices, e.g., read only memory, programmable read only memory, random access memory, flash memory, and the like. The non-transitory memory of the controller is capable of storing machine readable instructions, software, firmware, input/output (I/O) logic, etc., which can be accessed by and executed by one or more processors to provide the described functionality. Certain dynamic control routines may be executed in response to occurrence of a triggering event, such as but not limited to detection of the obstacle 16 of FIG. 1 as described herein. Communication between the various controllers, actuators, and sensors of the robot 10 may be accomplished using a wireless or hardwired communication link for the rapid exchange of electronic data signals.

OBSTACLE DETECTION CIRCUIT (12): In addition to the deformation sensors 22 described in detail below, which collectively replace the traditional bumpers noted above, the floor cleaning robot 10 can be equipped with one or more cliff sensors 48. The cliff sensors 48 can be bottom-facing optical or infrared (IR) position sensors that provide distance feedback and control the robot 10 so that the robot 10 can avoid excessive drops such as stairwells or ledges. Additional sensors for use with the obstacle detection circuit 12 may include at least one wall following sensor 50, as well as distance sensors, inertial sensors, etc.

The wall following sensor(s) 50 in some implementations can be located near one or both sides of the body 13 aft of the suction nozzle 24, and can include a side-facing optical, mechanical, or ultrasonic position sensor in different embodiments that provides distance feedback and controls the floor cleaning robot 10. In this manner, the robot 10 is able to travel near a wall without making contact therewith. Two wall-facing sensors are shown in the illustrated example, one on each side of the robot 10, without limiting the construction to such an embodiment.

DEFORMATION SENSOR (22): Within the scope of the disclosure, the obstacle detection circuit 12 includes at least one deformation sensor 22 connected to the body 13. Each deformation sensor 22 in turn is configured to measure a deflection or deformation of the body 13 and output an electronic signal 220 to the controller 42 indicative thereof in the course of operation of the floor cleaning robot 10. The controller 42, which is in wired or wireless communication with the deformation sensor(s) 22, is configured to detect a threshold deformation of the body 13 indicative of contact with the obstacle 16 (FIG. 1). This action occurs aboard the controller 42 by processing the electronic signal 220 using the processor(s) 44. The controller 42 thereafter modifies a dynamic state of the robot 10 via regulation of the motorized drive system 45 in response to the threshold deformation, e.g., by stopping, turning, or reversing the robot 10 so as to maneuver around the obstacle 16.

As noted above, the floor cleaning robot 10 can be characterized by an absence of perimeter bumpers and connected sensors for detecting front or side impacts. Instead, the controller 42 of the present disclosure relies on the electronic signals 220 from the deformation sensor(s) 22 to select a suitable obstacle avoidance algorithm from its memory 43, and to take appropriate evasive action as a dynamic control response. The elimination of a bumper and associated switches from the robot 10, particularly along the leading surface 14, thus enables a standoff distance (D) between the leading surface 14 and the suction nozzle 24 to be minimized, e.g., to about one wall thickness of the body 13, or about 5 mm or less in a possible construction.

Figure 3:
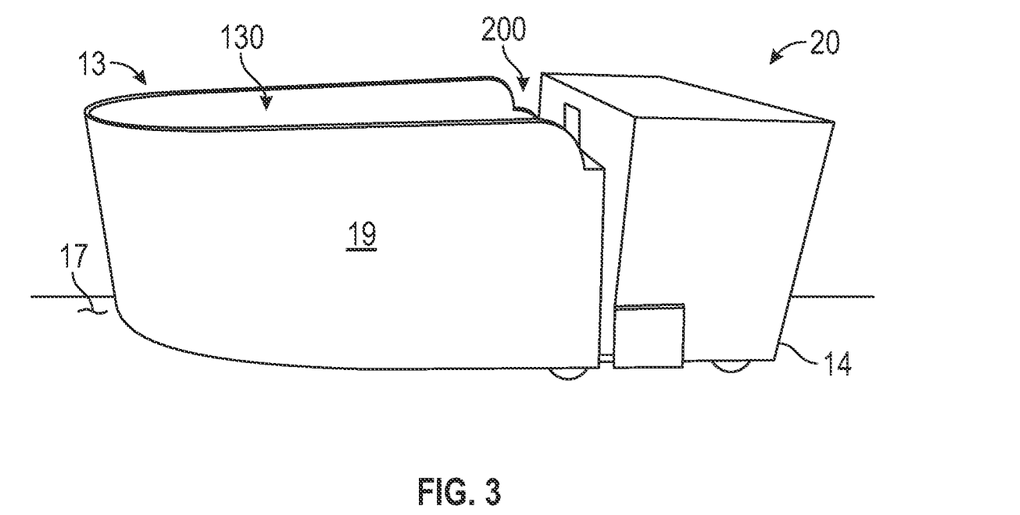
FIG. 3 is a perspective view illustration of a body and nozzle assembly usable with the floor cleaning robot of FIGS. 1 and 2.
Figure 4:
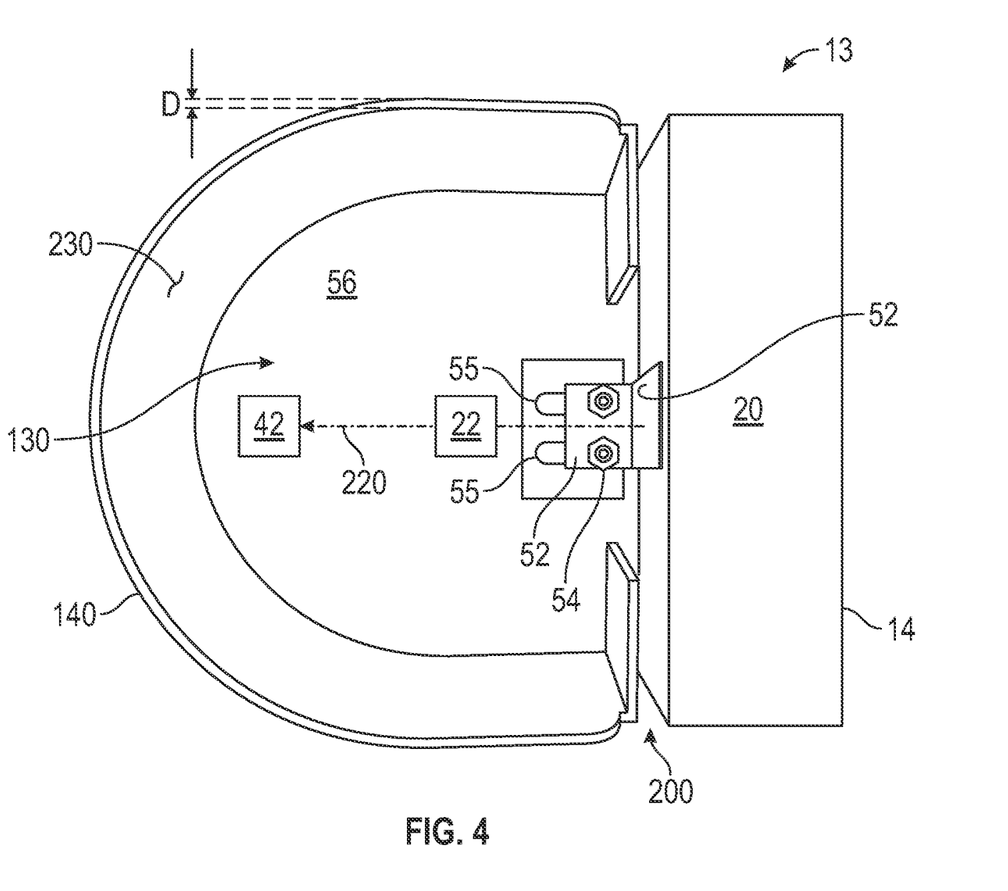
FIG. 4 is a plan view illustration of a portion of the body and nozzle assembly shown in FIG. 3, with an exemplary strain gauge connected along a hinge line in communication with a deformation sensor in accordance with an aspect of the disclosure.

Referring briefly to FIGS. 3 and 4, the body 13 of the floor cleaning robot 10 is shown with its upper surface and most of its associated functional components removed for illustrative clarity. The body 13 includes an inner surface 230 that at least partially defines a cavity 130 within which the various above-described components would be housed. In the illustrated configuration, the nozzle assembly 20 is connected to or formed integrally with the body 13, with the nozzle assembly 20 in this instance including the agitator 40 of FIG. 2 operable for cleaning the floor surface 17 shown in FIG. 1. Thus, a hinge joint 200 is present between the body 13 and the nozzle assembly 20 in this representative construction.

Figure 6A:
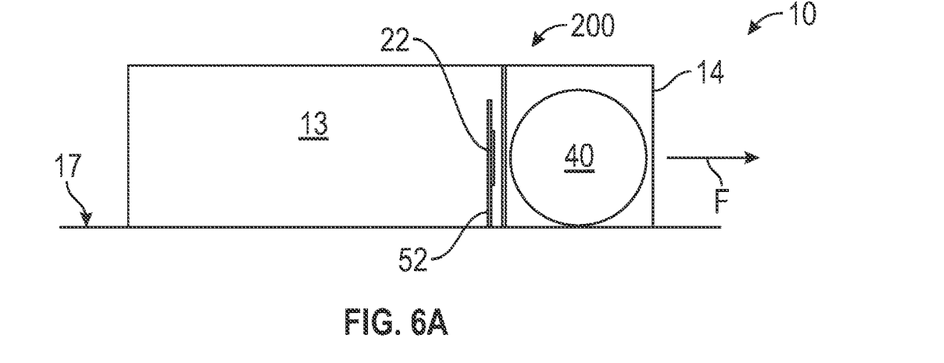
FIGS. 6A and 6B are schematic side view illustrations of the body and nozzle assembly of FIG. 5 describing operation of the present deformation sensors and associated brackets in accordance with the disclosure.
Figure 6B:
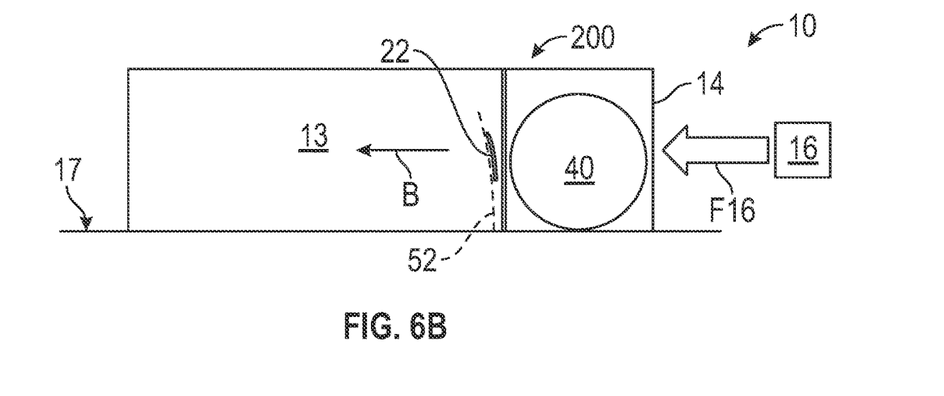

As best shown in FIG. 4, the deformation sensor 22, e.g., a strain gauge operable for measuring a respective strain value along a corresponding axis of the body 13, is shown mounted to a bracket 52 constructed of spring steel or another suitable flexible or resilient spring material. For instance, fasteners 54 may be passed through openings 55 in a floor 56 of the body 13 and tightened to secure the bracket 52 to the body 13. The bracket 52 thus has a fixed portion secured to the body 13 and a flexible portion angled relative to the fixed portion. The flexible portion of the bracket 52 is free-standing relative to the body 13 adjacent to the nozzle assembly 14 at the hinge joint 200, as best shown in FIGS. 6A and 6B. The deformation sensor 22 is connected to the bracket 52 to move in conjunction therewith, and thus to experience the same deflection or deformation forces when the body 13 contacts the obstacle 16 in FIG. 1. The deformation sensor 22 in turn is connected to the controller 42, e.g., via wires or wirelessly in different embodiments, with the controller 42 shown schematically in FIG. 4 for illustrative clarity.

Figure 5:
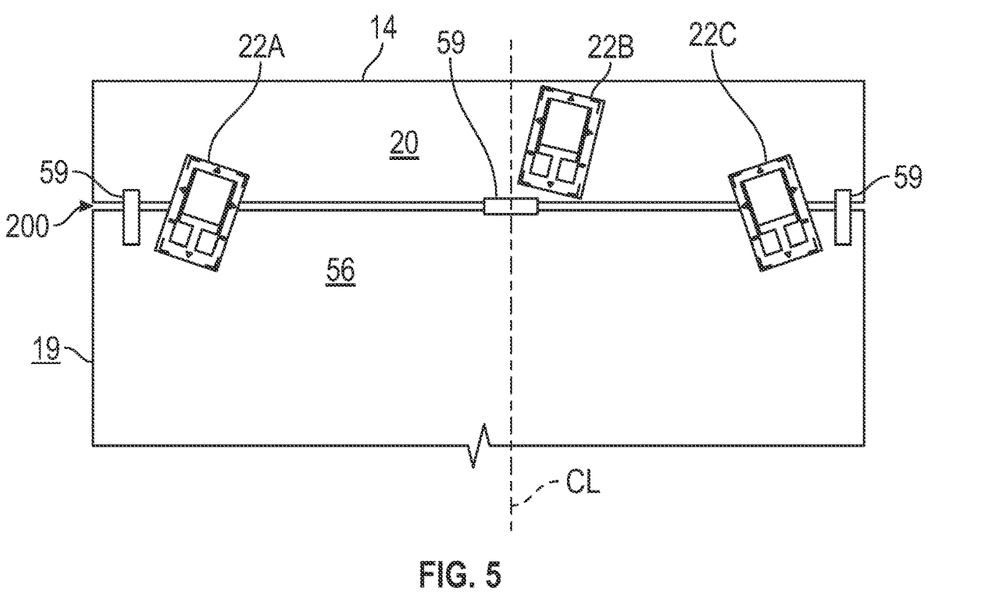
FIG. 5 is a schematic fragmentary illustration of the body and nozzle assembly of FIGS. 3 and 4 according to another possible construction using multiple deformation sensors.

Referring now to FIG. 5, which omits the trailing surface 140 of FIG. 4 for illustrative simplicity, the deformation sensor 22 may include a plurality of deformation sensors 22A, 22B, and 22C, which in a possible embodiment may include a plurality of strain sensors or gauges as shown. An aspect of the disclosure includes a center strain gauge, i.e., deformation sensor 22B, being positioned along or adjacent to a centerline (CL) of the body 13. In such an embodiment, a pair of strain sensors or gauges, i.e., the deformation sensors 22A and 22C, may be arranged to flank the center deformation sensor 22B.

In this embodiment, the nozzle assembly 20 is connected to the body 13 at or along the hinge joint 200 using one or more hinge assemblies 59. That is, a continuous hinge assembly 59 or several discrete hinge assemblies 59 may be used to interconnect the body 13 and the nozzle assembly 20, e.g., as an extension of the floor 56 or a separate hinge device or devices. At least one deformation sensor 22, in this instance the deformation sensors 22A, 22B, and 22C, can be positioned along or adjacent to the hinge joint 200. Additional deformation sensors 22 could be positioned elsewhere on the body 13 or within the cavity 130 (FIG. 3) in other embodiments within the scope of the disclosure.

FIGS. 6A and 6B illustrate the present teachings in a schematic side view illustration of the body 13 of FIG. 5, i.e., along the hinge joint 200. In FIG. 6A, the floor cleaning robot 10 moves along the floor surface 17 in the direction of arrow F. The agitator 40 within the nozzle assembly 20 is powered by an accompanying electric motor as noted above, and thus rotates within the nozzle assembly 20 to remove dirt and debris as part of its programmed cleaning task. As this occurs, the controller 42 of FIG. 2 continues to use the obstacle detection circuit 12 to monitor for cliffs, walls, inertial forces, and obstacles 16 (FIG. 1) located in the path of the robot 10.

In FIG. 6B, the same floor cleaning robot 10 is shown in close proximity to the obstacle 16. Forces F16 from the collision with the obstacle 16 are transmitted into the body 13 of the robot 10. This in urn causes the brackets 52 and the deformation sensors 22 of FIGS. 4 and 5 to flex away from the obstacle 16, as indicated by arrow B. As this occurs, each deformation sensor 22 measures a deflection or deformation along a particular axis of the body 13 and outputs the measured deformation as the above-noted electronic signal 220 shown in FIG. 2. The controller 42 detects a threshold deformation of the body 13 indicative of the contact with the obstacle 16, doing so by processing the electronic signal 220. The controller 42 thereafter modifies a dynamic state of the robot 10 via regulation of the motorized drive system 45 of FIG. 2 in response to the threshold deformation.

Figure 7:
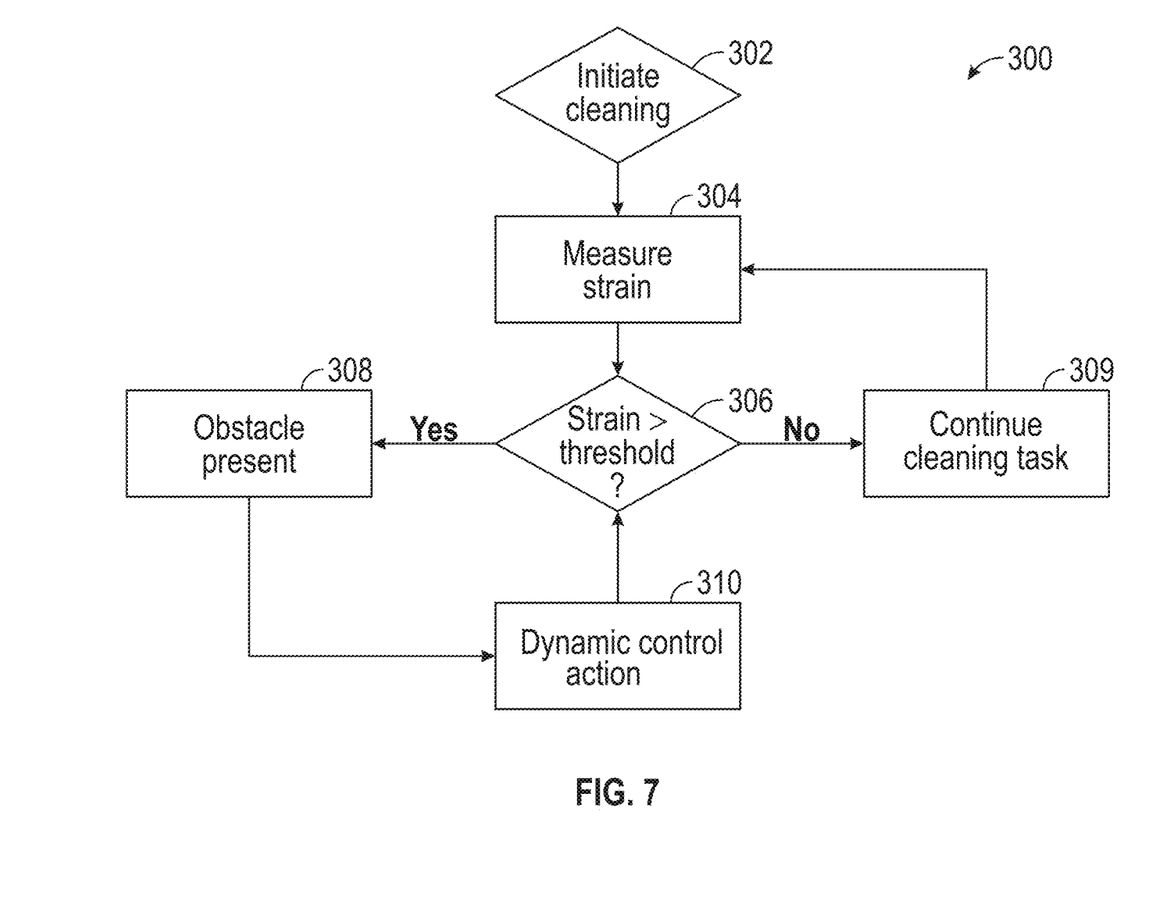
FIG. 7 is a flow chart illustrating a method for controlling the floor cleaning robot of FIGS. 1 and 2 based on a measured deformation or deflection response.

Referring now to FIG. 7, a method 300 is shown for controlling the floor cleaning robot 10 of FIGS. 1-6B in accordance with the foregoing disclosure. As noted above, the robot 10 includes the body 13 and the motorized drive system 45 of FIG. 2, with the motorized drive system 45 being operable for moving the robot 10 relative to the floor surface 17.

The method 300 according to a representative embodiment commences with block 302 by initiating cleaning of the floor surface 17 of FIG. 1. For instance, the controller 42 shown in FIG. 2 may be programmed to begin a cleaning task at a particular date and time according to a schedule, or in response to a request possibly selected via a computer application ("app") on a smart phone or tablet. Once the floor cleaning robot 10 has initiated cleaning, the robot 10 disengages and departs from a docking station (not shown) and begins its programmed cleaning operation. The method 300 then proceeds to block 304.

Block 304 includes measuring a deformation value via the deformation sensors 22, each of which is connected to the body 13 as described above and shown in FIGS. 2-6B. Block 304 may include converting a force or pressure resulting from an impact with the obstacle 16 of FIG. 1 into a measurable change in electrical resistance. When the deformation sensor 22 is embodied as a strain gauge, for instance, the strain is associated with the displacement and deformation that result from such contact. The method 300 proceeds to block 306 when the deformation has been measured at block 304.

At block 306, the method 300 includes detecting a threshold deformation of the body 13 via the controller 42 of FIG. 2. This occurs by processing the electronic signal 220 transmitted or otherwise communicated by the deformation sensor(s) 22 when the body 13 contacts the obstacle 16. The method 300 proceeds to block 308 if the measured deformation from block 304 is greater than the threshold deformation, and to block 309 in the alternative if the measured deformation is less than the threshold deformation.

Block 308 of FIG. 7 may include registering a presence of the obstacle 16. That is, the controller 42 of FIG. 2 may record a predetermined bit string or alphanumeric code in its memory 43 indicative of the obstacle 16 having been affirmatively detected. The method 300 then proceeds to block 310.

Block 309 of the method 300 includes continuing with cleaning task, with the results of prior-executed block 306 having determined that, even if a detectable amount of deformation has occurred, such deformation is deemed negligible. The method 300 then returns to block 304 as the floor cleaning robot 10 continues with its cleaning task, with the robot 10 eventually returning to its docking station to recharge or to discharge its collected debris as needed.

Block 310 includes executing a dynamic control action of the floor cleaning robot 10 in response to the detected presence of the obstacle 16 (see FIG. 1). For instance, block 310 may include modifying a dynamic state of the floor cleaning robot 10 via the motorized drive system 45 of FIG. 2, under the supervisory direction of the controller 42, in response to the threshold deformation. Exemplary control actions that may be executed in block 310 include stopping, reversing, and/or turning the robot 10 to avoid the obstacle 16. The method 300 then proceeds to block 306.

The following Clauses provide some representative configurations of floor cleaning robots and methods for controlling the same as disclosed herein.

Clause 1: A robot comprising: a body; a motorized drive system connected to the body and operable for moving the robot relative to a surface; at least one deformation sensor connected to the body, wherein the at least one deformation sensor is configured to measure a deformation of the body and output an electronic signal indicative of the deformation; and a controller in communication with the at least one deformation sensor, wherein the controller is configured to detect a threshold deformation of the body indicative of contact with an obstacle by processing the electronic signal, and to thereafter modify a dynamic state of the robot via regulation of the motorized drive system in response to the threshold deformation.

Clause 2: The robot of clause 1, wherein the at least one deformation sensor includes at least one strain gauge operable for measuring a respective strain value along a corresponding axis of the body.

Clause 3: The robot of clause 2, wherein the at least one strain gauge includes a plurality of strain gauges.

Clause 4: The robot of clause 3, wherein each respective one of the strain gauges is mounted to a corresponding flexible bracket constructed of spring steel.

Clause 5: The robot of either of clauses 3 or 4, wherein the plurality of strain gauges includes a center strain gauge positioned adjacent to a centerline of the body and a pair of strain gauges flanking the center strain gauge.

Clause 6: The robot of any of clauses 1-5, further comprising: a nozzle assembly connected to or formed integrally with the body, wherein the nozzle assembly includes an agitator operable for cleaning the surface.

Clause 7: The robot of clause 6, further comprising: a hinge assembly that interconnects the body and the nozzle assembly along a hinge joint, wherein the at least one deformation sensor is positioned along or adjacent to the hinge joint.

Clause 8: The robot of any of clauses 1-7, wherein the robot is characterized by an absence of an obstacle-detecting perimeter bumper assembly.

Clause 9: The robot of any of clauses 1-8, wherein the body includes a leading surface relative to a forward direction of travel of the robot, the robot further comprising: an agitator connected to the body less than about 5 millimeters from the leading surface of the body.

Clause 10: The robot of clause 9, wherein the leading surface of the body is a planar surface and an opposing trailing surface of the body is a curvilinear surface, such that the robot has a generally D-shaped outer perimeter.

Clause 11: A method for autonomously controlling a robot having a body and a motorized drive system operable for moving the robot relative to a surface, the method comprising: measuring a deformation of the body via a deformation sensor connected to the body; outputting an electronic signal via the deformation sensor that is indicative of the deformation; detecting a threshold deformation of the body when the body contacts an obstacle, including processing the electronic signal via a controller; and modifying a dynamic state of the robot via the controller and the motorized drive system in response to the threshold deformation, including stopping and/or turning the robot.

Clause 12: The method of clause 11, wherein measuring the deformation via the deformation sensor includes measuring a respective strain value along a corresponding axis of the body using at least one strain gauge.

Clause 13: The method of clause 12, wherein measuring the respective strain value along the corresponding axis of the body includes measuring the respective strain value using a center strain gauge positioned adjacent a centerline of the body and a pair of strain gauges flanking the center strain gauge.

Clause 14: The method of any of clauses 11-13, wherein the robot includes a nozzle assembly and a hinge assembly that interconnects the body and the nozzle assembly along a hinge joint, and wherein the deformation sensor is connected to the body along or adjacent to the hinge joint, the method further comprising: measuring the deformation along or adjacent to the hinge joint.

Clause 15: A floor cleaning robot, comprising: a body having a leading surface relative to a forward direction of travel of the floor cleaning robot; a nozzle assembly connected to or formed integrally with the body, the nozzle assembly including a brush roll positioned less than about 5 millimeters from the leading surface of the body; a motorized drive system connected to the body and operable for moving the floor cleaning robot relative to a floor surface; a plurality of strain sensors connected to the body and/or the nozzle assembly via a corresponding flexible bracket, wherein each respective one of the strain sensors is configured to measure a deformation of the body as a strain value, and to output an electronic signal indicative of the strain value; and a controller in communication with plurality of strain sensors, wherein the controller is configured to detect a threshold deformation of the body indicative of contact with an obstacle by processing the electronic signal, and to thereafter modify a dynamic state of the floor cleaning robot via regulation of the motorized drive system in response to the threshold deformation, wherein the floor cleaning robot is characterized by an absence of an obstacle-detecting perimeter bumper assembly.

Clause 16: The floor cleaning robot of clause 15, wherein the corresponding flexible bracket is constructed of spring steel.

Clause 17: The floor cleaning robot of either of clauses 15 or 16, wherein the plurality of strain gauges includes a center strain gauge positioned adjacent a centerline of the body and a pair of strain gauges flanking the center strain gauge.

Clause 18: The floor cleaning robot of any of clauses 15-17, further comprising: a hinge assembly that interconnects the body and the nozzle assembly along a hinge joint, wherein the plurality of strain gauges includes at least one strain gauge positioned along or adjacent to the hinge joint.

Clause 19: The floor cleaning robot of any of clauses 15-18, wherein the leading surface is a planar surface and an opposing trailing surface of the body is a curvilinear surface, such that the floor cleaning robot has a generally D-shaped outer perimeter.

Clause 20: The floor cleaning robot of any of clauses 15-19, wherein the floor cleaning robot is characterized by an absence of an obstacle-detecting perimeter bumper assembly.

While some of the best modes have been described in detail, various alternative designs may exist for practicing the present teachings defined in the appended claims. Those skilled in the art will recognize that modifications may be made to the disclosed embodiments without departing from the scope of the subject disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A robot comprising:
   a body;
   a motorized drive system connected to the body and operable for moving the robot relative to a surface;
   a nozzle assembly including a leading surface of the robot relative to a forward direction of travel of the robot;
   a hinge assembly that interconnects the body and the nozzle assembly along a hinge joint;
   at least one flexible bracket having a fixed portion secured to the body and a flexible portion angled relative to the fixed portion, the flexible portion free-standing relative to the body adjacent to the nozzle assembly at the hinge joint;
   at least one deformation sensor mounted to the at least one flexible bracket, wherein the at least one flexible bracket flexibly deforms in response to a force on the leading surface transmitted to the body and the at least one deformation sensor is configured to measure a deformation of the at least one flexible bracket along an axis of the body and output an electronic signal indicative of the deformation; and
   a controller in communication with the at least one deformation sensor, wherein the controller is configured to detect a threshold deformation indicative of contact with an obstacle by processing the electronic signal, and to thereafter modify a dynamic state of the robot via regulation of the motorized drive system in response to the threshold deformation.

2. The robot of claim 1, wherein the at least one deformation sensor includes at least one strain gauge operable for measuring a respective strain value along a corresponding axis of the body.

3. The robot of claim 2, wherein the at least one strain gauge includes a plurality of strain gauges;
   wherein the at least one flexible bracket includes a plurality of flexible brackets; and
   wherein each respective one of the strain gauges is mounted to a corresponding one of the flexible brackets.

4. The robot of claim 3, wherein the flexible brackets are constructed of spring steel.

5. The robot of claim 3, wherein the plurality of strain gauges includes a center strain gauge positioned adjacent a centerline of the body and a pair of strain gauges flanking the center strain gauge.

6. The robot of claim 1, wherein the robot is characterized by an absence of an obstacle-detecting perimeter bumper assembly.

7. The robot of claim 1, wherein the nozzle assembly includes an agitator operable for cleaning the surface and positioned less than 5 millimeters from the leading surface.

8. The robot of claim 7, wherein the leading surface is a planar surface and an opposing trailing surface of the body is a curvilinear surface, such that the robot has a generally D-shaped outer perimeter.

9. A method for autonomously controlling a robot having a body, a nozzle assembly, a hinge assembly that interconnects the body and the nozzle assembly along a hinge joint, and a motorized drive system operable for moving the robot relative to a surface, the method comprising:
   measuring a deformation resulting from contact of an obstacle with a forward surface of the robot via a deformation sensor on a flexible bracket connected to the body, wherein the flexible bracket has a fixed portion secured to the body and a flexible portion angled relative to the fixed portion, the flexible portion free-standing relative to the body adjacent to the nozzle assembly at the hinge joint;
   outputting an electronic signal via the deformation sensor that is indicative of the deformation;
   determining whether the deformation is greater than a threshold deformation, including processing the electronic signal via a controller; and
   in response to the deformation being greater than a threshold deformation, modifying a dynamic state of the robot via the controller and the motorized drive system in response to the threshold deformation, including stopping and/or turning the robot.

10. The method of claim 9, wherein measuring the deformation via the deformation sensor includes measuring a respective strain value along a corresponding axis of the body using at least one strain gauge.

11. The method of claim 10, wherein measuring the respective strain value along the corresponding axis of the body includes measuring the respective strain value using a center strain gauge positioned adjacent a centerline of the body and a pair of strain gauges flanking the center strain gauge.

12. The method of claim 9, further comprising: measuring the deformation along or adjacent to the hinge joint.

13. A floor cleaning robot, comprising:
   a body;
   a nozzle assembly connected to or formed integrally with the body, the nozzle assembly having a leading surface relative to a forward direction of travel of the floor cleaning robot and including a brush roll positioned less than 5 millimeters from the leading surface;
   a hinge assembly that interconnects the body and the nozzle assembly along a hinge joint;
   a motorized drive system connected to the body and operable for moving the floor cleaning robot relative to a floor surface;

a plurality of strain sensors, each respective one of the strain sensors connected to the body and/or the nozzle assembly via a corresponding flexible bracket, wherein the corresponding flexible bracket has a fixed portion secured to the body and a flexible portion angled relative to the fixed portion, the flexible portion free-standing relative to the body adjacent to the nozzle assembly at the hinge joint, wherein each respective one of the strain sensors is configured to measure a deformation of the corresponding flexible bracket as a strain value, and to output an electronic signal indicative of the strain value; and a controller in communication with the plurality of strain sensors, wherein the controller is configured to detect a threshold deformation indicative of contact with an obstacle by processing the electronic signal, and to thereafter modify a dynamic state of the floor cleaning robot via regulation of the motorized drive system in response to the threshold deformation, wherein the floor cleaning robot is characterized by an absence of an obstacle-detecting perimeter bumper assembly.

14. The floor cleaning robot of claim 13, wherein the corresponding flexible bracket is constructed of spring steel.

15. The floor cleaning robot of claim 13, wherein the plurality of strain sensors includes a center strain gauge positioned adjacent a centerline of the body and a pair of strain gauges flanking the center strain gauge.

16. The floor cleaning robot of claim 15, wherein the plurality of strain sensors includes at least one strain gauge positioned along or adjacent to the hinge joint.

17. The floor cleaning robot of claim 13, wherein the leading surface is a planar surface and an opposing trailing surface of the body is a curvilinear surface, such that the floor cleaning robot has a generally D-shaped outer perimeter.

18. The floor cleaning robot of claim 15, wherein the plurality of strain sensors includes at least one strain gauge positioned along or adjacent to the hinge joint.

* * * * *